United States Patent [19]

Dorsey et al.

[11] Patent Number: 4,919,804
[45] Date of Patent: Apr. 24, 1990

[54] ULTRASOUND DRIVEN SYNTHESIS OF REVERSED AND NORMAL PHASE STATIONARY PHASES FOR LIQUID CHROMATOGRAPHY

[75] Inventors: John G. Dorsey; Karen B. Sentell, both of Gainesville, Fla.; Karen W. Barnes, Verona, N.J.

[73] Assignee: University of Florida, Gainesville, Fla.

[21] Appl. No.: 346,286

[22] Filed: May 1, 1989

Related U.S. Application Data

[63] Continuation of Ser. No. 162,515, Mar. 1, 1988, abandoned.

[51] Int. Cl.$^5$ .............................................. B01D 15/08
[52] U.S. Cl. .............................. 210/198.2; 210/502.1; 210/635; 210/656; 210/658; 502/5; 502/400
[58] Field of Search ................... 502/5, 400; 210/635, 210/656, 658, 198.2, 502.1

[56] References Cited

U.S. PATENT DOCUMENTS

| | | | |
|---|---|---|---|
| 3,925,369 | 12/1975 | Vincent | 548/569 |
| 4,199,477 | 4/1980 | Hegedus | 502/5 |
| 4,303,529 | 12/1981 | Huckins | 210/656 |
| 4,379,783 | 4/1983 | Melvin | 556/440 |
| 4,406,792 | 9/1983 | Glad | 210/656 |
| 4,415,631 | 11/1983 | Schutijser | 210/656 |
| 4,431,544 | 2/1984 | Atkinson | 210/510.1 |
| 4,431,546 | 2/1984 | Hughes | 210/656 |
| 4,435,388 | 3/1984 | Ganguly | 514/30 |
| 4,436,729 | 3/1984 | Ganguly | 514/30 |

FOREIGN PATENT DOCUMENTS

| | | | |
|---|---|---|---|
| 53-60883 | 5/1978 | Japan | 502/5 |
| 250889 | 10/1977 | U.S.S.R. | 502/5 |

OTHER PUBLICATIONS

Bristow, "Liquid Chromatography in Practice", HETP Publisher, Cheshire, U.K. 1976, p. 95.
"Some Modern Concepts in Reversed-Phase Liquid Chromatography on Chemically Bonded Akyl Stationary Phases", by Nelson H. C. Cooke & Kristine Olsen—Journal of Chromatographic Science, vol. 18, Oct. 1980; pp. 512-514.
"Nucleophilic Displacement at Silicon Stereochemistry and Mechanistic Implications", by Robert J. P. Corriu and Christian Guerin—Journal of Organometallic Chemistry, 198 (1980) 231-320.
"Introduction to Modern Liquid Chromatography", Second Edition, by L. R. Synder & J. J. Kirkland, pp. 274-275; (1979).
"Role of the Functional Group in n-Octyldimethysilanes in the Synthesis of C$_8$ Reversed-Phase Silica Packings for High Performance Liquid Chromatography", by K. D. Lork et al—Journal of Chromatograph, 352(1986) 199-211.
"Preparation of Various Bonded Phases for HPLC Using Monochlorosilanes" by Gert E. Berendsen, et al—Journal of Liquid Chromatograph, 3(10), 1437-1464 (1980).
"Effect of Alkyl Chain Length on Surface Silanization of Silica", by Wei Cheng et al—Journal of Chromatography, 319(1985), pp. 173-185.
"Preparation and Chromatographic Properties of Some Chemically Bonded Phases for Reversed-Phase Liquid Chromatograph" by Gert E. Berendsen et al—Journal of Liquid Chromatography, 1(5), 561-586 (1978).
"Improved Silica-Based Column Packings for High-Performance Liquid Chromatography", by J. Kohler et al—Journal of Chromatography, 385(1987).
"Role of Solvent and Base in the Silanization Reaction of Silicas for Reversed-Phase Higher Performance Liquid Chromatography" by J. N. Kinkel et al—Journal of Chromatography, 316 (1984) 193-200.
"Comprehensive Characterization of Some Silica--Based Stationary Phases for High-Performance Liquid Chromatography", by J. Kohler et al—Journal of Chromatography, 352(1986) 275-305.
"Synthesis with Ultrasonic Waves" by Philip Boudjouk, J. Chem. Ed., vol. 63, No. 5, May 1986, pp. 427-429.
"Starting Recalcitrant Grignard Reactions", by S. Clough et al, J. Chem. Ed., University of Richmond, Richmond, Va., 1986, 63(2), p. 176.
"Organic Sonochemistry. Ultrasonic Acceleration of the Hydrosilation Reaction" by Byung-Hee Han et al—Department of Chemistry, North Dakota State University, Organometallics, vol. 2, pp. 769-771 (1983).
"Bats Use It for Navigation..." by David Bremner—Chemistry in Britain, vol. 22, pp. 633-638 (1986).
"Sonochemistry Part 1—The Physical Aspects" by J. P. Lorimer et al—Chemical Society Reviews, 1987, 16,23-274.
"Synthetic Applications of Ultrasound" by K. S. Sualick—Modern Synthetic Methods, 1986, 4, 1-60.
"Organic Sonochemistry. Ultrasound Promoted Coupling of Chlorosilanes in the Presence of Lithium Wire" by P. Boudjouk et al—The Department of Chemistry/-North Dakota State University. Tetrahedron Letters, vol. 22, No. 39, pp. 3813-3814, 1981.
"Organic Sonochemistry. Ultrasound Promoted Reaction of Zinc..." by Barry M. Trost et al.—McElvain Laboratories of Organic Chemistry, J. Org. Chem. 1982, 47, pp. 751-752.
"Sonoluminescence of NO— and NO$_2$— Saturated Water as a Probe of Acoustic Cavitation" by C. Sehgal et al—J Phys. Chem. 1980, 84, 396-401.
"Contemporary Practice of Chromatography" by Colin F. Poole et al, Department of Chemistry, Wayne State University 1984, p. 224.

Primary Examiner—Ernest G. Therkorn
Attorney, Agent, or Firm—Kerkam, Stowell, Kondracki & Clarke

[57] ABSTRACT

In a method for producing a reversed phase bonded metal oxide by reacting the metal oxide with a reactive silane, the improvement comprising conducting the reaction in the presence of ultrasonic waves.

8 Claims, No Drawings

ULTRASOUND DRIVEN SYNTHESIS OF REVERSED AND NORMAL PHASE STATIONARY PHASES FOR LIQUID CHROMATOGRAPHY

Research leading to the development of the invention described herein was supported in part by NIH Grant No. GM-33382. The U.S. Government has certain rights to the invention.

This is a continuation of application Ser. No. 162,515, filed Mar. 1, 1988, now abandoned.

BACKGROUND OF THE INVENTION

1. Field of the Invention

The present invention relates to reversed and normal stationary phases for liquid chromatography and methods for their production.

2. Description of the Prior Art

Reversed and normal phase bonded metal oxides, particularly silica, are the most popular packings used in high performance liquid chromatography (HPLC). Although the role of the mobile phase in chromatographic retention and selectivity has been extensively studied, that of the stationary phase has only come under intense scrutiny recently. As a result, the effects of the stationary phase on chromatographic properties is not yet fully understood.

The stationary phases are generally prepared by converting, e.g., by hydrolysis, the oxide groups on the metallic oxide to hydroxyl groups and reacting the latter with reactive silanes, e.g., silyl halides to produce the silylated metal oxide and, in the case of a halide reactant, a hydrogen halide by-product.

One reason for this dearth of knowledge as to the effect of the stationary phases on chromatographic properties is the lack of precise and reliable methods for determining bonded phase characteristics such as the density, homogeneity and topographical distribution of the bonded silyl ligands and the residual hydroxyl groups on the support surface. These properties are a direct consequence of the bulk metallic oxide medium and the reagent and reaction conditions for the silanization process [Kinkel et al, *J. Chromatogr.*, Vol. 316, pp 193–200 (1984)]. In order to obtain reversed phase packings with reproducible surface characteristics, the silanization reaction conditions must be painstakingly controlled. Careful optimization of these reaction conditions makes possible the reproducible synthesis of bonded phases.

In the preparation of reversed phase packings, one objective is the modification of as many surface hydroxyl groups on the silica as possible, especially the highly acidic isolated silanols. These residual isolated silanol groups have been shown to be the main cause of tailing of chromatographic peaks for basic compounds, of mechanical instability for the packing, and of low sample capacity for the column [Kohler et al, *J. Chromatogr.*, Vol. 352, pp. 275–305 (1986); Kohler et al, *J. Chromatogr.*, Vol. 385, pp. 125–150 (1987)]. Di- or tri-reactive alkylsilanes had previously found favor over monoreactive silanes because of their greater reactivity and the possibility of reacting simultaneously with two or three hydroxyl groups. However, any unreacted sites on the bonded functional groups will be hydrolyzed upon contact with water (i.e., from the mobile phase), forming additional undesirable silanol groups [Snyder et al, "*Introduction to Liquid Chromatography*", 2nd ed., Wiley-Interscience: N.Y., 1979; Chapter 7; Berendsen et al, *J. Liq. Chromatogr.*, Vol. 1, pp. 561–586 (1980)]. Di- and tri-reactive silane reagents also often result in nonreproducible stationary phases since the degree of polymerization is highly dependent on the residual water content of the metal oxide and the reagents used in the bonding reaction [Snyder, supra]. Another drawback of polymeric stationary phases is their lower chromatographic efficiency, which results from poor solute mass transfer in these relatively thick stationary phases. Therefore, many investigators now advocate the use of monofunctional silanes for the derivatization reaction, since this results in a reproducible and well-defined chemically bonded phase. Additionally, monomeric stationary phases generally exhibit superior column performance to polymeric phases due to their faster solute mass transfer kinetics [Cooke et al, *J. Chromatogr.*, Vol. 18, pp. 512–524 (1980)]. For the derivatization of silica with octadecyldimethylchlorosilane, the most commonly used monoreactive silane, the resulting bonding reaction may be depicted thusly:

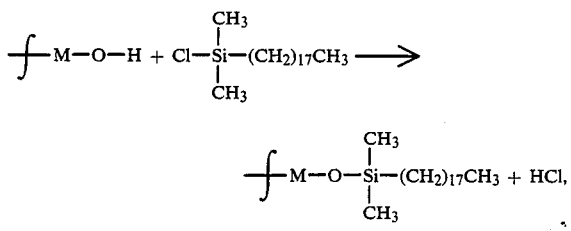

where M is a metal.

Kinkel and Unger, supra, have studied the roles of the solvent and the base in these monofunctional bonding reactions and have found their choice to be crucial. When alkylhalosilanes are reacted with silica, a base is added to serve as the acid-acceptor catalyst, binding the haloacid formed during the reaction and driving the equilibrium to the product side. In addition, the base favorably affects the kinetics of the silanization reaction. Mechanistic studies of these types of reactions [Corriu et al, *J. Organomet. Chem.*, Vol. 198, pp. 321–320 (1980)] have shown that two molecules of base attack one molecule of silane, activating the Si-X bond such that a reactive intermediate and a hydrohalide are formed. Formation of this reactive intermediate greatly increases the kinetics of the bonding reaction; indeed, the addition of the acid-acceptor catalyst results in approximately 90% of the total conversion taking place within the first hour of the reaction [Kinkel et al, supra]. In their study, Kinkel and Unger found that the two most effective acid-acceptor catalysts for organohalosilanes were imidazole and 2,6-lutidine.

The reaction solvent must also be carefully chosen. The solvent can interact specifically with the silane, the base and the surface silanol groups on the silica. When the solvent interacts with a silanol group, there is a considerable effect on the strength of the bond between the silicon and oxygen atoms. Solvents which have both a pronounced Lewis acid and Lewis base character cause the SiO bond strength to be weakened and facilitate the bonding reaction. The solvent can also activate the silicon atom of the organohalosilane by forming a pentacoordinated intermediate through nucleophilic attack. The resultant bond lengthening causes nucleophilic activation to occur, favoring attack by a second nucleophile (such as the base). The solvent may influence the base as well, as it is known that in aprotic polar solvents the nucleophilic character of reactants is more pronounced. All of these considerations may have a synergistic relationship as well. Based on their experimental work with organohalosilanes, Kinkel and Unger found that methylene chloride and N,N-dimethylformamide were the most effective solvents for the bonding reaction.

Many organic reactions have been shown to be enhanced by ultrasound [Lorimer et al, *Chem Soc. Rev*, Vol. 16, pp. 239–274 (1987); Lindley et al, *Chem. Soc. Rev.*, Vol. 16, pp. 275–311 (1987); Bremner, *Chem Br.*, Vol. 22, pp. 633–638 (1986); Boudjouk, *J. Chem. Educ.*, Vol. 63, pp. 427–429 (1986); Han et al, *Organometallics*, Vol. 2, pp. 769–771 (1983); Clough et al, *J. Chem. Educ.*, Vol. 63, p. 176 (1986); Suslick, *Mod. Synth. Methods*, Vol. 4, pp. 1–60 (1986). Boudjouk and Han have shown [Boudjouk et al, *Tetrahedron Lett.*, Vol. 22, pp. 3813–3814 (1981)] that in the presence of ultrasonic waves both alkyl and aryl chlorosilanes could be coupled over lithium wire; without ultrasonification, this reaction occurred to no appreciable extent. Reactions at solid-liquid interfaces have also been shown to be enhanced by ultrasound [Bremner, supra; Suslick, supra].

It is an object of the present invention to provide a novel reversed phase stationary phase for liquid chromatography and an improved method for the manufacture thereof.

SUMMARY OF THE INVENTION

The above and other objects are achieved by the present invention which provides an improved method for the production of a reversed phase bonded metal oxide particularly adapted for use as a packing in high performance liquid chromatography, the method comprising reacting the metal oxide, in which at least some, preferably most of the oxide groups have been converted to hydroxyl groups, with a substituted or unsubstituted alkyl silane reactive with the hydroxyl groups to produce a silylated derivative of the metal oxide wherein the improvement comprises conducting the reaction in the presence of ultrasonic waves.

An additional embodiment of the invention comprises the reversed phase bonded metal oxide produced according to the above-described method which possesses unexpectedly enhanced chromatographic properties not shared by stationary phases known heretofore.

The use of ultrasound has two distinct advantages over traditional reflux methods. The ultrasonic waves serve as a driving force which is *independent* of temperature, allowing reaction temperatures to be varied over any desired range. Secondly, the *power* of the ultrasonic driving force can be varied by using a variable power ultrasonic probe.

Although the reaction is particularly suited to the derivatization of silica, it may also be employed to derivatize any metallic oxide useful as a stationary phase in HPLC, e.g., alumina ($Al_2O_3$), zirconium oxide ($ZrO_2$), titanium dioxide ($TiO_2$), iron oxide ($Fe_2O_3$), etc.

For the derivatization of silica the most effective commercially available silane is a silyl halide which produces the silylated metal oxide and a hydrogen halide by-product which may be "removed" from the reaction mixture utilizing a basic acid-acceptor. Other reactive silanes include alkoxysilanes, dimethylamino silanes, organsilanols, trifluoroacetoxysilanes, etc.

The metallic oxide is converted to the hydroxylated form according to any conventional method, e.g., acid or base hydrolysis.

Although any acid-acceptor may be utilized to bind the acidic by-product and drive the reaction to completion, it has unexpectedly been found that 4-dimethylaminopyridine functions far more effectively than conventional acid acceptors such as 2,6-lutidine, imidazole, pyridine, triazole, triethylamine, etc., all of which act not only as acid acceptors but also in forming reactive intermediates at the silica-solution interface.

Any reactive silane may be employed to derivatize the metallic oxide. Thus, any substituted or unsubstituted alkyl silyl derivative may be employed which produces a final product useful as a stationary phase for HPLC. Typical of such derivatives are dimethyloctadecylchlorosilane, trimethylchlorosilane, octyldimethylchlorosilane, methyloctadecyldichlorosilane, octadecyltrichlorosilane, aminopropyldimethylchlorosilane, cyanopropyldimethylchlorosilane, phenyldimethylchlorosilane, dimethyloctadecylmethoxysilane, dimethyloctadecylethoxysilane, etc.

Ultrasound in 20 kHz to 10 MHz range, preferably 20 kHz to 55 kHz, and having acoustic wavelengths in the range of from about 7.6 to about 0.015 cm may be employed in the practice of the invention.

The invention is illustrated by the following non-limiting examples.

The chromatographic silica employed in the examples was from a single lot of synthetic amorphous silica and had an average pore diameter of 147 Å, an absolute surface area ($S_{BET}$, as measured by BET analysis) of 300 $m^2/g$, a particle size range of 20–30 μm with an 80% distribution of 23±10 μm and a nitrogen pore volume of 1.10 $cm^3/g$. The silica was acid leached in 0.1M nitric acid at 90° C. for 24 hours in order to fully hydroxylate the surface and to remove any metal contaminants remaining from the manufacturing process. The silica was then washed thoroughly with water until all traces of the nitric acid had been removed and dried under vacuum at 240° C. for 24 hours prior to use in order to remove physically adsorbed water from the surface.

It is essential that the silane bonding reaction be carried out under scrupulously dry conditions in order to prevent the water-initiated polymerization of the silane reagent. Glassware used in the derivatization reaction was presilanized by etching the surface with a 10% (v/v) hydrofluoric acid solution, drying, and then soaking the glassware for an hour in a 5% (v/v) trimethylchlorosilane in chloroform solution. Immediately prior to use, the glassware was oven dried at 125° C. for at least 4 hours in order to remove trace moisture and allowed to cool in a dry box under nitrogen atmosphere. The reagents were mixed together in a dry box and the reaction flasks kept under dry nitrogen atmosphere at all times. Based on Kinkel and Unger's [supra] estimation of a maximum of five micromoles of reactive hydroxyl sites per square meter of silica surface, a twofold excess of the silane reagent was added. A fourfold excess of the base (2,6-lutidine or 4-DMAP) was added both to serve as an acid-acceptor catalyst for the HCl produced in the reaction and to act as a reactive intermediate at the silica-solution interface. Dry methylene chloride was used as the reaction solvent, using a ratio of 10 ml of methylene chloride per gram of base silica.

The reaction flasks were sonicated by immersion to the flask neck in an ultrasonic cleaning bath (Bransonic Model B-2200R-1, Branson Cleaning Equipment Co., Shelton, Conn.) with a power rating of 100 W and a frequency of 55 kHz. Stirring of the reagents within the flasks was accomplished by rotating a magnetic bar submerged in the bath adjacent to the reaction flask, resulting in the corresponding rotation of a magnetic stirring bar within the flask. Temperature control of the ultrasonic bath was accomplished by passing a thermostatted solution of ethylene glycol and water through coiled copper tubing lining the inner perimeter of the bath. The solution was thermostatted by an Endocal or Exacal water bath. Refluxed reactions were carried out at 50° C. using an oil bath and magnetic stirrer. Control reactions were carried out by stirring the reaction mixture at room temperature. Reactions were carried out for 24 hours unless otherwise noted.

Once the reaction time was complete, the product was washed in order to remove excess reagents. Each bonded phase product was washed three times with each solvent using the rinse sequence methylene chloride, methanol, 50/50 (v/v) methanol/water, methanol and diethyl ether. After the ether was allowed to evaporate from the product, the derivatized silica was dried in a vacuum oven at 125° C. for 16-24 hours. Products were analyzed by elemental analysis performed at least in duplicate for each sample. Reliability of the elemental analysis was confirmed by repeated submission of a standard packing material over a two year period; for 66 measurements the resultant standard deviation was ±0.20% carbon, corresponding to an uncertainty in the octadecyl bonding density of 0.03 $\mu$mol/m$^2$.

Ultrasonic radiation can be introduced to the reaction medium either by immersion of the reaction vessel into the liquid of a common laboratory ultrasonic cleaning bath or by introduction of an ultrasonic generating probe directly into the reaction medium.

Ultrasonic frequencies span the range of 20 kHz to 10 MHz, with associated acoustic wavelengths of 7.6 to 0.015 cm. Therefore, sonochemistry cannot be accounted for in terms of direct coupling of the acoustic field with chemical species on a molecular level. However, the effects of ultrasound can be attributed to three different phenomena. The variation of sonic pressure causes the rapid movement (oscillation) of fluids, subjecting them to compression and rarefaction. Negative pressure in the rarefaction region gives rise to cavitation, the formation and collapse of microbubbles. The violent implosion of these microbubbles generates powerful shock waves with a considerable energy output. Pressures in the kilobar range and temperatures of 2000°-3000° C. have been estimated in the region of the collapsing bubble for time periods in the nanosecond range [Sehgal et al, $J.$ $Phys.$ $Chem.,$ Vol. 84, pp. 396-401 (1980)]. The third contributing phenomenon is microstreaming, where a large amount of vibrational energy is put into small volumes with little heating. The extremes of temperature and pressure generated by ultrasonic waves causes the generation of free radicals and ions, the dispersion of chemical layers and the promotion of intimate contact between reactants. Emulsification of immiscible liquids and enhanced mass transfer at solid-liquid interfaces are secondary effects of ultrasonification. All of these effects can contribute to the promotion of chemical reactions.

In order to define the surface coverage of the bonded silica, the surface coverage should be expressed as the number of silane molecules attached to the surface, usually as micromoles of bonded silane molecules per square meter of silica surface, taking into account the increase in weight of the silica after the bonding reaction. These surface coverages are calculated from the percentage of carbon as obtained from elemental analysis of the bonded phase. This calculation is quite straightforward for monoreactive silanes and for monochlorosilanes (the most commonly used monoreactive reagents) can be expressed by:

$$\alpha = \frac{(\% \text{ C}) (10^6)}{(12.011) (n_c) (S) (100 - [(\% \text{ C}/(12.011(n_c)](M - 36.5))} \quad (1)$$

where $\alpha$ is the surface coverage ($\mu$moles/m$^2$); %C is grams carbon per 100 grams bonded silica, as obtained from elemental analysis; $n_c$ is the number of carbon atoms per mole silane; M is the molecular weight of the silane; and S is the surface area of the native silica in m$^2$/g. Although the typical value for the average surface hydroxyl concentration of amorphous silica is 8 $\mu$mol/m$^2$ [Cheng et al, $J.$ $Chromatogr.,$ Vol. 318, pp. 173-185 (1985)], in practice octadecyl bonded phase coverages are limited to about 3 $\mu$mol/m$^2$ due to steric considerations [Snyder et al, supra; Berendsen et al, supra; Cheng, supra and Berendsen et al, $J.$ $Liq.$ $Chromatogr.,$ Vol. 3, pp. 1437-1464 (1980)].

EXAMPLE 1

Three sets of experiments were compared in order to determine the effect of ultrasound on the silica bonding reaction. In all cases dimethyloctadecylchlorosilane was the reactive silane, methylene chloride was the reaction solvent and 2,6-lutidine the acid-acceptor catalyst; all reaction mixtures were stirred during the reaction time period (24 hours). In the first set of experiments, the reaction was performed at ambient temperature (22.0° C.); in the second set the reaction mixture was refluxed at 50.0° C. The third set of experiments was performed at 28.5° C., but the reaction vessels were immersed in an ultrasonic cleaning bath. The refluxed stationary phases had an average bonding density (±one standard deviation over three trials) of 2.82±0.02 $\mu$mol/m$^2$. The room temperature reaction resulted in a bonding density of 2.69 $\mu$mol/m$^2$ with a range of ±0.03 $\mu$mol/m$^2$ over two trials; the ultrasound reaction gave a bonded phase (over two trials) with an average bonding density of 2.71±0.01 $\mu$mol/m$^2$. The small bonding density difference between the stirred reaction at ambient temperature and the one at reflux temperature is not surprising as Lork et al have shown that the bonding density increases slightly and in a linear fashion with increasing reaction temperature when monochlorosilanes are used as the silanizing reagent [Lork et al, $J.$ $Chromatogr.,$ Vol. 352, pp. 199-211 (1986)]. These experimental results show that ultrasound is indeed a viable method for the bonded phase synthesis, giving results which are comparable to those obtained using traditional reflux techniques.

EXAMPLE 2

Two sets of experiments were performed using ultrasound in conjunction with subambient reaction temperatures to determine the effect of subambient temperature on the ultrasound reaction. In achieving high bonding densities one of the greatest obstacles is increasing steric hindrance at the silica surface as more and more bulky dimethyloctadecylsilyl groups are bonded to the surface. It is possible that at low temperatures the bonding density might be enhanced due to the increased order (decreased entropy) in a lower temperature system. It is here that the ultrasound reactions are most unique, as they allow the temperature of the reaction to be controlled independently of the ultrasonic driving force. In order to overcome the slower kinetics expected at lower temperatures, reaction times were increased beyond the usual 24 hour time period.

In the first set of experiments, two reaction vessels were sonicated and stirred at 15.0° C. for 48 hours with a resultant average bonding density (±the range) of 2.74±0.00 $\mu$mol/m$^2$. Since this result was little different from that at room temperature, it was decided to increase the reaction time as well as decreasing the reaction temperature. In this set of experiments, two reaction flasks were sonicated and stirred at 8.5° C. for 101 hours with a resultant average bonding density of 2.84±0.01 $\mu$mol/m$^2$, a slightly higher value than for those ultrasound reactions run at higher temperatures. These results indicate that subambient temperatures indeed enhance the ultrasonic silica bonding reaction.

EXAMPLE 3

The following experiments were designed to determine the effect of acoustic power. The relative acoustic powers of two Bransonic 55 kHz ultrasonic baths were measured by submerging a piezoelectric transducer in the water of each operating bath and measuring the resulting voltage on an oscilloscope. For baths with equal operating frequencies, a constant impedance of the transducer will result. Since the impedance is equal to the voltage measured squared divided by the acoustic power, measurement of the resultant voltages from the transducer allows the relative acoustic power of the two baths to be measured; as a consequence one bath was found to be three times more powerful than the other (much older) bath.

Bonding reactions were performed for 24 hours in each bath using the same reagents as previously. The derivatized silica from the higher power bath was found to have a higher bonding density (2.87 $\mu$mol/m$^2$) than that from the lower power bath (2.19 $\mu$mol/m$^2$).

EXAMPLE 4

The following experiments demonstrate the unexpected superiority of 4-dimethylaminopyridine as the acid-acceptor catalyst.

The first set of experiments using 4-DMAP as the acid-acceptor catalyst was performed using methylene chloride as the solvent and dimethyloctadecylchlorosilane as the reactive silane. The reaction mixture was refluxed and stirred at 50.0° C. for 24 hours. The bonded phase product had an average bonding density (±the range for two trials) of 3.44+0.02 $\mu$mol/m$^2$, much higher than that achieved in our previous synthesis using 2,6-lutidine (2.82±0.02 $\mu$mol/m$^2$). This bonding density is also greater than that accomplished by Kinkel and Unger (3.34 $\mu$mol/m$^2$) under reflux conditions using methylene chloride and 2,6-lutidine [Kinkel et al, supra]. This is especially significant because the silane in our experiments was used as received from a commercial source; Kinkel and Unger synthesized and then distilled their silane under reduced pressure in order to obtain a reactive silane of the utmost purity. Silane purity has been shown to be a very important factor in obtaining high bonding densities [Kinkel et al, supra].

The second set of experiments using 4-DMAP as the acid-acceptor catalyst was run with the same reagents as described above; the reaction mixture was immersed in the ultrasonic bath and stirred at a temperature of 31.0° C. for 24 hours. The average bonding density of the resultant bonded phases (±the range for two trials) was 3.35±0.05 $\mu$mol/m$^2$, again much higher than that achieved under similar circumstances using 2,6-lutidine as the acid-acceptor catalyst (2.71±0.01 $\mu$mol/m$^2$).

A low temperature ultrasound reaction was then carried out under the same conditions as stated above, with a reaction temperature of 4.0° C. for a duration of 97 hours. For the two trials, an average bonding density of 3.24±0.01 $\mu$mol/m$^2$ was obtained. A second set of low temperature ultrasound reactions was performed under analogous conditions with a reaction temperature of 3.0° C. for 144 hours. The bonded phase resulting from this experiment had a higher bonding density than achieved in any of our previous attempts; the average ± the range for the set was 3.60±0.01 $\mu$mol/m$^2$. This bonding density is higher than any previously reported in the literature using dimethyloctadecylchlorosilane as the reactive silane [Kinkel et al, supra; Cheng et al, supra; Berendsen et al, supra].

To ensure that the high bonding density in this second low temperature experiment was a result of the ultrasonic driving force as well as the lengthy reaction time, two other reactions were carried out. In one, the reaction was performed exactly as above (at 3.0° C. for 144 hours with stirring) except that the reaction flask was *not* sonicated. In the other, the reaction was stirred for 144 hours, but the reaction mixture was refluxed at 50.0° C. rather than sonicated. From duplicate elemental analyses of each of these two materials, the average bonding density (±the range) for the silica stirred (but not sonicated) at 3.0° C. for 144 hours was 3.48±0.00 $\mu$mole/m$^2$; that for the silica refluxed and stirred at 50.0° C. for 144 hours was 3.44±0.03 $\mu$mole/m$^2$. Since the absolute error in the elemental analysis is +0.20% carbon, which corresponds to ±0.03 $\mu$mole/m$^2$ for the octadecyl packings, the differences in bonding density between these two materials and the silica which was sonicated at 3.0° C. for 144 hours (3.60 $\mu$mole/m$^2$) is both real and significant. Therefore, it can be concluded that subambient ultrasound reactions are especially efficacious for synthesizing stationary phases with very high bonding densities.

Subambient temperatures can be defined as those temperatures below about 20° C.

EXAMPLE 5

In order to investigate the effect of superambient temperatures on the ultrasonic bonding reaction, two types of experiments were performed. In the first, the reaction was carried out by stirring with the same reagents as previously described for a reaction time of 24 hours and with the ultrasonic bath maintained at a temperature of 50.0° C. For two trials, the average ± the range was 3.34+0.04 $\mu$mol/m$^2$, virtually identical to that achieved under ambient ultrasonic conditions (3.35±0.05 $\mu$mol/m$^2$). In the second experiment, the reagents were stirred and sonicated at 31.0° C. for one hour and then refluxed and stirred at 50.0° C. for an additional 23 hours, in hopes that the preliminary sonication of the reagents would permit greater accessibility of the reactive silane to silanols located deep within the silica pores. The resulting bonding density (for two trials) of 3.42±0.03 $\mu$mol/m$^2$ is comparable to that achieved under reflux conditions alone (3.44±0.02 $\mu$mol/m$^2$). These results indicate that silica bonding reactions performed in an ultrasonic bath are not affected by superambient temperatures; this is in contrast to those performed at subambient temperatures, which were found to give an increasing yield as the temperature was decreased.

EXAMPLE 6

Experiments were also carried out in the ultrasonic bath at 28.0° C. for 24 hours using trimethylchlorosilane (TMCS) as the reactive silane, 4-DMAP as the base and methylene chloride as the reaction solvent. TMCS is a much smaller molecule than the octadecyl silane and therefore should approximate the maximum bonding density obtainable in these reactions when steric hindrance is minimized. The average bonding density achieved in the two trials was $3.51 \pm 0.01$ $\mu mol/m^2$; the octadecyl bonding densities achieved in the above reactions show that the TMCS bonding density at ambient temperatures can be exceeded even with bulky octadecyl reagents under subambient conditions. The results of these 4-DMAP experiments, as summarized in Table I, demonstrate that it is indeed a superior acid-acceptor catalyst to 2,6-lutidine for reversed phase bonding reactions.

TABLE I

Comparison of octadecyl bonding densities using 4-DMAP and 2,6-lutidine as acid-acceptor catalysts.

| Reaction Conditions | Temperature (°C.) | Reaction Time (hrs) | C-18 Bonding Density ($\mu mol/m^2$) | |
|---|---|---|---|---|
| | | | 4-DMAP | 2,6-lutidine |
| Refluxed | 50.0 | 24 | 3.44 | 2.82 |
| Ultrasound | 28.0 | 24 | — | 2.71 |
| Ultrasound | 31.0 | 24 | 3.35 | — |
| Ultrasound | 8.5 | 101 | — | 2.84 |
| Ultrasound | 4.0 | 97 | 3.24 | — |
| Ultrasound | 3.0 | 144 | 3.60 | — |
| Stirred Only | 3.0 | 144 | 3.48 | — |

TABLE I-continued

Comparison of octadecyl bonding densities using 4-DMAP and 2,6-lutidine as acid-acceptor catalysts.

| Reaction Conditions | Temperature (°C.) | Reaction Time (hrs) | C-18 Bonding Density ($\mu mol/m^2$) | |
|---|---|---|---|---|
| | | | 4-DMAP | 2,6-lutidine |
| Refluxed | 50.0 | 144 | 3.44 | — |

We claim:

1. In a method for the production of a reversed phase bonded metal oxide particularly adapted for use as a packing in high performance liquid chromatography, said method comprising reacting said metal oxide, in which at least some of the oxide groups have been converted to hydroxyl groups, with a substituted or unsubstituted alkyl silane reactive with said hydroxyl groups to produce a silyated derivative of said metal oxide, the improvement comprising conducting said reaction in the presence of ultrasonic waves at a temperature below about 20° C.

2. In a method according to claim 1, the additional improvement comprising conducting said reaction in the presence of an amount of 4-dimethylaminopyridine sufficient to react with any acidic by-product of said reaction and to act in forming a reactive intermediate at the silica-solution interface.

3. The method of claim 1 wherein said metal oxide is selected from the group consisting of silica, alumina, zirconia, titania, iron oxide.

4. The method of claim 1 wherein said metal oxide is silica.

5. The method of claim 1 wherein said reactive silane is a chlorosilane.

6. The method of claim 5 wherein said chlorosilane is dimethyloctadecylchlorosilane.

7. The method of claim 1 wherein said chlorosilane is trimethylchlorosilane.

8. The method of claim 1 wherein said ultrasonic waves have frequencies in the range of from about 20 kHz to about 10 MHz and acoustic wavelengths in the range of from about 7.6 to about 0.015 cm.

* * * * *